US012729125B2

(12) United States Patent
Abali et al.

(10) Patent No.: US 12,729,125 B2
(45) Date of Patent: Sep. 8, 2026

(54) PRODUCTION OF METAL BORATES WITH NANO-DIMENSION

(71) Applicant: CELAL BAYAR UNIVERSITESI TEKN. GEL. BOL. A. S., Manisa (TR)

(72) Inventors: Yuksel Abali, Manisa (TR); Osman Agus, Balikesir (TR); Osman Arslan, Istanbul (TR)

(73) Assignee: CELAL BAYAR UNIVERSITESI TEKN. GEL. BOL. A. S., Manisa (TR)

( * ) Notice: Subject to any disclaimer, the term of this patent is extended or adjusted under 35 U.S.C. 154(b) by 761 days.

(21) Appl. No.: 17/921,984

(22) PCT Filed: Feb. 8, 2021

(86) PCT No.: PCT/TR2021/050112
§ 371 (c)(1),
(2) Date: Oct. 28, 2022

(87) PCT Pub. No.: WO2021/221582
PCT Pub. Date: Nov. 4, 2021

(65) Prior Publication Data

US 2023/0159341 A1 May 25, 2023

(30) Foreign Application Priority Data

Apr. 28, 2020 (TR) ................................ 2020/06658

(51) Int. Cl.
*C01B 35/12* (2006.01)
*B82Y 40/00* (2011.01)

(52) U.S. Cl.
CPC ............. *C01B 35/127* (2013.01); *B82Y 40/00* (2013.01); *C01P 2002/72* (2013.01); (Continued)

(58) Field of Classification Search
None
See application file for complete search history.

(56) References Cited

U.S. PATENT DOCUMENTS 3,472,787 A * 10/1969 Kucirka .................. C01B 35/06 423/625

FOREIGN PATENT DOCUMENTS

CN 101845668 A 9/2010
CN 102229839 A 11/2011
(Continued)

OTHER PUBLICATIONS

CN 104477931A machine translation (Year: 2014).*
(Continued)

*Primary Examiner* — Sally A Merkling
*Assistant Examiner* — Nicole Lee Quist
(74) *Attorney, Agent, or Firm* — Bayramoglu Law Offices LLC

(57) ABSTRACT

A metal borate production method is realized by the reaction, $M(NO_3)+Na_2B_4O_7\cdot10H_2O\rightarrow M\cdot B_2O_3\cdot nH_2O+NaNO_3+nH_2O$, between borax and perchlorate or nitrate solution comprising a metal, or another completely dissolved metal salt in stochiometric proportion and the synthesis of nano-structured metal borates having antibacterial characteristic without addition of a second solvent or additive substance to the medium.

5 Claims, 2 Drawing Sheets

(Ag)

(Cu)

(52) U.S. Cl.
CPC ...... *C01P 2002/85* (2013.01); *C01P 2004/03* (2013.01); *C01P 2004/64* (2013.01); *C01P 2006/90* (2013.01)

(56) References Cited

FOREIGN PATENT DOCUMENTS

| CN | 102417189 A | | 4/2012 |
|---|---|---|---|
| CN | 102633277 A | | 8/2012 |
| CN | 103626198 A | | 3/2014 |
| CN | 104477931 A | * | 4/2015 |

OTHER PUBLICATIONS

Ibrahim Keskin, "Nanosized zinc borate production by chemical methods", Marmara University Institute for graduate studies in pure and applied sciences, Thesis, 2009 (Year: 2009).*

Osman Agus, et al., Facile and controlled production of silver borate nanoparticles, SN Applied Sciences A Springer Nature Journal, 2019, 1:662.

* cited by examiner (Ag)

(Cu)

(Zn)

(Ag)

(Cu)

(Zn)

PRODUCTION OF METAL BORATES WITH NANO-DIMENSION

CROSS REFERENCE TO THE RELATED APPLICATIONS

This application is the national phase entry of International Application No. PCT/TR2021/050112, filed on Feb. 8, 2021, which is based upon and claims priority to Turkish Patent Application No. 2020/06658, filed on Apr. 28, 2020, the entire contents of which are incorporated herein by reference.

TECHNICAL FIELD

The present invention relates to production of metal borates with nano-dimension which can be essentially used in the production of fireproof materials (fireproof clothes, fireproof fabrics, fireproof fiber, fireproof plastic) and besides which have high antimicrobial and antifungal activity.

BACKGROUND

Metal borates can be used in a multi-purpose manner in various materials because of their antibacterial and anticorrosive characteristics which result from boron which exists in the compositions thereof. Another usage area of metal borates thanks to their boron ingredient and their tribological characteristics is the usage thereof as additive material for preventing friction/abrasion in motor lubricants.

Nano-particles, having dimension under 100 nanometer (nm), exhibit some unexpected characteristics because of their different and superior structures in surface/volume proportions. Thanks to the superior characteristics shown by nano-structure particles, nano-structure particles have usage in various industrial fields primarily in electric-electronic, bio-medical, automotive and chemistry fields. It is seen that different production methods are developed since the physicochemical and morphologic characteristics of nano-particles are affected by the characteristic of the used beginning material.

Nano-particle systems or structures with nano-dimension show very special electric and magnetic characteristics and these different characters result from their high surface/volume structures. If the structures have substantially small dimension, characteristics may occur which are called quantum enclosing effect and which can be observed only in structures which have such dimensions. In fact, the factor which makes the nano-particles such unique is these characteristics. Thanks to these characteristics, nano-particles can find various applications in catalytic, electromagnetic, optic, surface technologies and medical fields.

Basically, nano-particles can be evaluated at an intermediate region between molecules and amorphous materials. For the synthesis of nano-particles, two different methods can be used, namely, bottom-up and top-down. Nano-particles can have metal-based, metal oxide based, chalcogenide, carbon-based, carbide, boride or silicide structure. In other words, on the base of the composition, nano-particles with approximately thousands of different structures and compositions can be formed.

The most important point after production of nano-particles is to prevent the agglomeration thereof. There are steric, electrostatic and electro-steric methods for preventing agglomeration. However, since these methods sometimes lead to special conditions, they are generally used in required times. Thus, the polymer molecules may also have to be adhered to the surface as another passivation surface or core/shell methods.

Boron element is an element which exists in various different industrial usage areas and 75% of boron exists in Turkey. Among these usage areas, areas like agriculture, metallurgy, medicine also exist. Generally borate compounds can be used in structures which are abrasion-preventive, fire-resistant and at the same time corrosion-resistant. The characteristics of borate structures like resistance to high temperature, resistance to acids and bases and thermal isolation are known. Besides, borates are used as additive material to plastics, as a special glass type and in reinforced nano-composite materials.

In the art, metal borate nano-structures have been synthesized with various different methods. These methods are for instance vapor accumulation method, high temperature solid methods, sol-gel method and hydrothermal method. As known, these methods need high energy and include complicated tools and conditions. Accordingly, in the method we applied, only precipitation method has been used and said high complications have been eliminated.

The patent with number CN 101845668A relates to synthesizing nano-dimensioned nickel borate filaments. In said invention, inorganic nickel, boric acid, citric acid and water are mixed with different proportions. This is a sol gel method.

The patent with number CN 103626198A, nickel nitrate salt has been made basic and afterwards, boric acid has been added. Afterwards, this mixture has been subjected to process in a hydrothermal manner for 18 hours at 240 degrees. After filtration, washing and drying processes, sintering or calcination process has been realized at 700 degrees.

As a result, by means of the present invention, a new production method is recommended for bringing additional novelties to the abovementioned related technical field.

SUMMARY

The present invention relates to production of nano-dimension metal borates which can be used in various fields, for eliminating the abovementioned disadvantages and for bringing new advantages to the related technical field.

The main object of the present invention relates to production of metal borates, having nano-dimension, which is simple, sustainable and repeatable.

Another object of the present invention relates to production of metal borates, having nano-dimension, which does not necessitate usage of inert gases.

Another object of the present invention relates to production of metal borates, having nano-dimension, which does not need a second solvent.

In order to realize the abovementioned objects and the objects which are to be deducted from the detailed description below, the present invention relates to the production method of metal borate, having nano-structure, which provides antibacterial characteristic and moreover incombustibility characteristic. Accordingly, thanks to said production method, metal borate is obtained with nano or micro dimensions.

The present invention provides realization of the reaction between borax and perchlorate or nitrate solution comprising a metal, or another completely dissolved metal salt in stoichiometric proportion and the synthesis of nano-structured metal borates having antibacterial characteristic without addition of a second solvent or additive substance to the medium. Accordingly, the production method is characterized by the following steps:

- The amounts of metal perchlorate or nitrate solution and borax compound, which are reactive, are adjusted so as to be at a value between 1:1 and 2:1 by mole in a compliant manner to the reaction stoichiometry;
- Borax compound is added to the metal perchlorate or nitrate solution with adjusted amounts and mixing process is applied at a value between 25 rpm and 250 rpm;
- The reaction duration lasts for at least 2 hours at fixed temperature;
- Washing, filtration and drying processes are applied to the precipitation obtained as a result of the reaction;
- Sintering process is applied to the final product, if preferred, between temperatures 400° C. and 1500° C.

In a possible embodiment of the present invention, said metal in the solution comprising the metal is Zn, Cu having +2 ion valence, or Ag metal having +1 valence.

In a possible embodiment of the present invention, said reaction temperature is between 40° C. and 90° C.

In a possible embodiment of the present invention, pH of the reaction medium is at a value between 6 and 8.

In a possible embodiment of the present invention, said sintering process is realized at fixed temperature between 2 and 24 hours.

DETAILED DESCRIPTION OF THE EMBODIMENTS

Figures 1A, 1B, 1C, 2A, 2B, 2C:
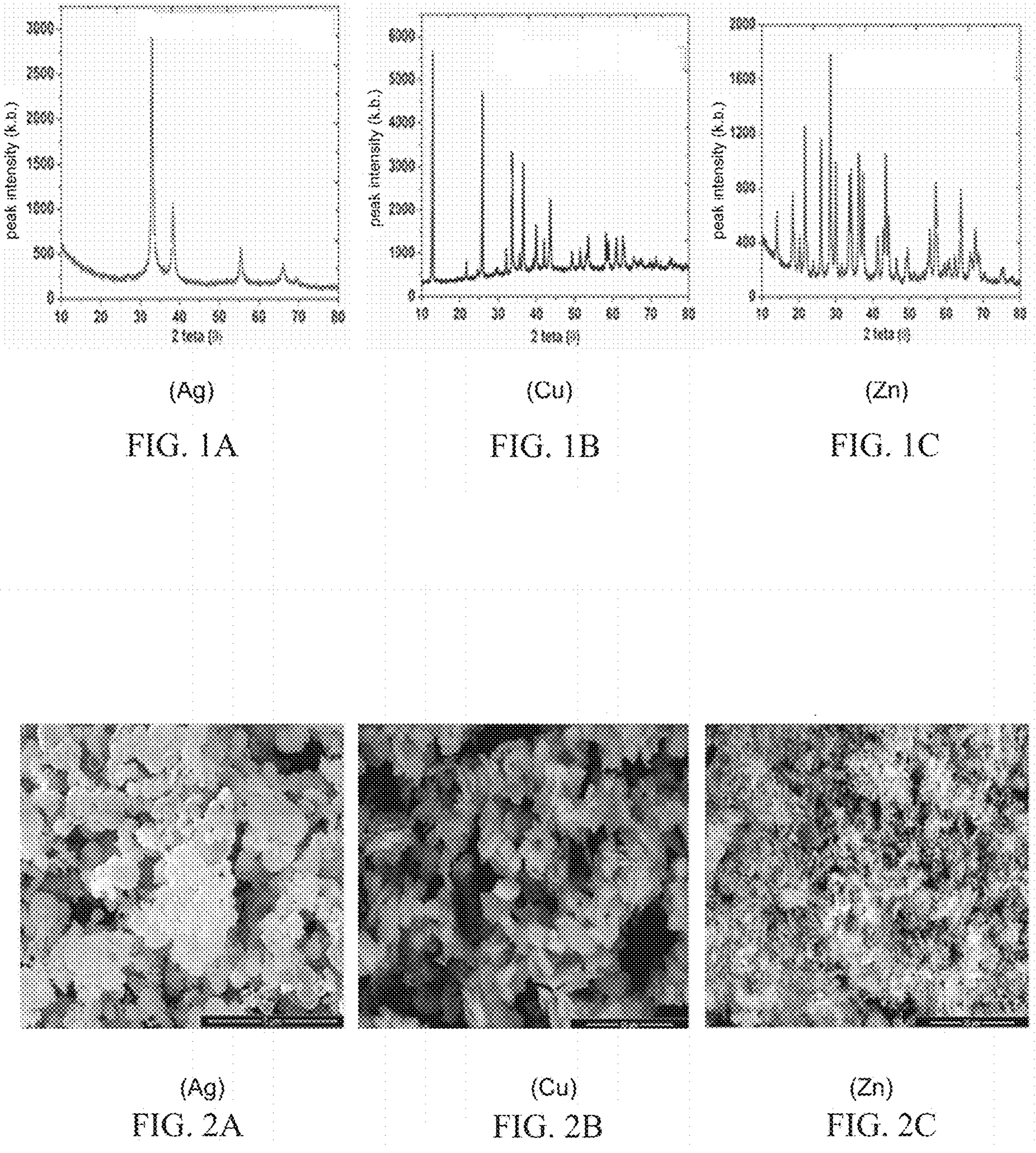
In FIGS. 1A-1C, XRD images of silver borate, copper borate and zinc borates obtained by means of the subject matter method are given.
In FIGS. 2A-2C, SEM images of silver borate, copper borate and zinc borates obtained by means of the subject matter method are given.

In this detailed description, the subject matter relates to production of nano-dimension metal borates which have various usage areas, and is explained with references to examples without forming any restrictive effect only in order to make the subject more understandable.

Said invention essentially relates to production of metal borates by means of a simple precipitation method which does not need high energy like high temperature and extra media like inert gases and complicated devices.

The present invention provides easing of productions of metal borates present in the art and decrease of the effort consumed in the present production. The basic function of the present invention is to provide a production method, which is a novel sustainable and repeatable method, to the related technical field.

The present invention essentially advances in a stoichiometric manner as shown in Equation 1, and metal borates are obtained as the final product.

$$M(NO_3)+Na_2B_4O_7\cdot 10H_2O=M\cdot B_2O_3\cdot nH_2O+NaNO_3+nH_2O$$

Metal Nitrate+Borax→Metal Borate+Sodium Nitrate Water

Equation 1. Obtaining metal borate

In the production method of metal borates by means of precipitation, nitrates and/or perchlorates, which are easily dissolvable, preferably nitrates and/or perchlorates which are dissolved at room temperature, are used as the metal source. Said metal sources can be perchlorates, nitrate and/or completely dissolving salts having +2 and +1 charged ions. Nitrate and/or perchlorates, comprising silver, nickel, zinc and copper metals, is/are preferably used.

The method of production of metal borates by means of precipitation is a method which needs pH control of the medium. Said medium pH must be 7 and in intervals which are close to 7. In media where the pH value is basic, it is more probable that metal oxide structures are formed instead of metal borate.

In the method of production of metal borates by means of precipitation, the molarity value of the metal source solutions used as the beginning substance is important. By means of the precipitation to be used in the present invention, the most important inputs for the production of nano-structured metal borates are pH and temperature of the medium and the molarity of the beginning components. In a preferred application, the molarity proportion of the input, including metal, to the input, including boron, is between 1.5 and 2. When the molarity of the preferred structure comprising metal is 2 times of the molarity of the boron including structure, good results are obtained.

The subject matter relates to production of metal borates by means of the precipitation method, the production method of nano-structured metal borates is characterized by the application of the following processes:

- Adding specific amount of borax compound into the metal including solutions and mixing the mixture at obtained specific speeds,
- Obtaining precipitate after the mixing process,
- Applying washing, filtration and drying processes to the precipitate,
- Applying sintering process.

Obtaining metal borates by means of the precipitation method to be used in the present invention takes place after realization of the reactions between the borax compound and the solution, comprising metal, in stoichiometric proportion as also known beforehand. For the stoichiometric proportion preferred in the invention, the metal including solution/borax mole proportion changes between 0.5 or 1 or 1.5 and finally 2. In the preferred application, the metal including solution/borax mole proportion is 2:1.

It has not been detected that there is a very big alkali medium in the obtained solutions during the reaction. However, borax is related to the characteristics of the tetra-borate root structure which forms boric acid naturally and which makes the medium basic. Adding this chemical root in additional amount increases pH value relatively, however a very big basic medium is not observed. In the reaction, the temperature is at substantially acceptable points.

The solution comprising metal is perchlorate and nitrate solutions preferably comprising Zn, Cu and Ag metals.

Except the solution which comprises metal, a second solvent or additive material is not added to the medium.

The mixing process mentioned in the present invention is realized with speed of at least 100 rpm. The reaction is realized such that the duration thereof is at least 2 hours. The reaction temperature is between 40° C. and 90° C. And it is applied at fixed temperature.

The obtained precipitation is washed at least 3 times. And the precipitation is preferably dried between 75° C. and 90° C.

In order for the precipitate to gain the required chemical ingredient, the precipitate is subjected to sintering process between 400° C. and 1500° C. The sintering process is realized at fixed temperature between 2 hours and 24 hours.

The innovative characteristic in the present invention is that in order to provide formation of nano-structured metal borates, a method is applied with substantially easy reaction conditions and with relatively simpler reaction conditions. The total reaction is cheaper both in terms of heat and cost and has characteristics which can be produced in industrial base. Particularly during the reaction, the conditions and the calcination temperature have been improved in a more suitable manner consuming less energy. The production method presented to the related technical field is considered to present additional advantages.

In the invention, XRD analysis of silver borate, zinc borate and copper borates obtained by means of realization of the reaction between borax and perchlorate or nitrate solution, including a metal, in a stoichiometric proportion as shown in Equation 1 is given in FIGS. 1A-1C. Accordingly, when the fingerprints of the obtained final products are examined, it is seen that silver borate, copper borate and zinc borate structures are observed.

In FIGS. 2A-2C, SEM images of silver borate, zinc borate and copper borates obtained by means of realization of the reaction between borax and perchlorate or nitrate solution, including a metal, in a stoichiometric proportion as shown in Equation 1 are given. Thanks to said SEM images, the surface images of the obtained final products are determined.

Figures 3A, 3B, 3C:
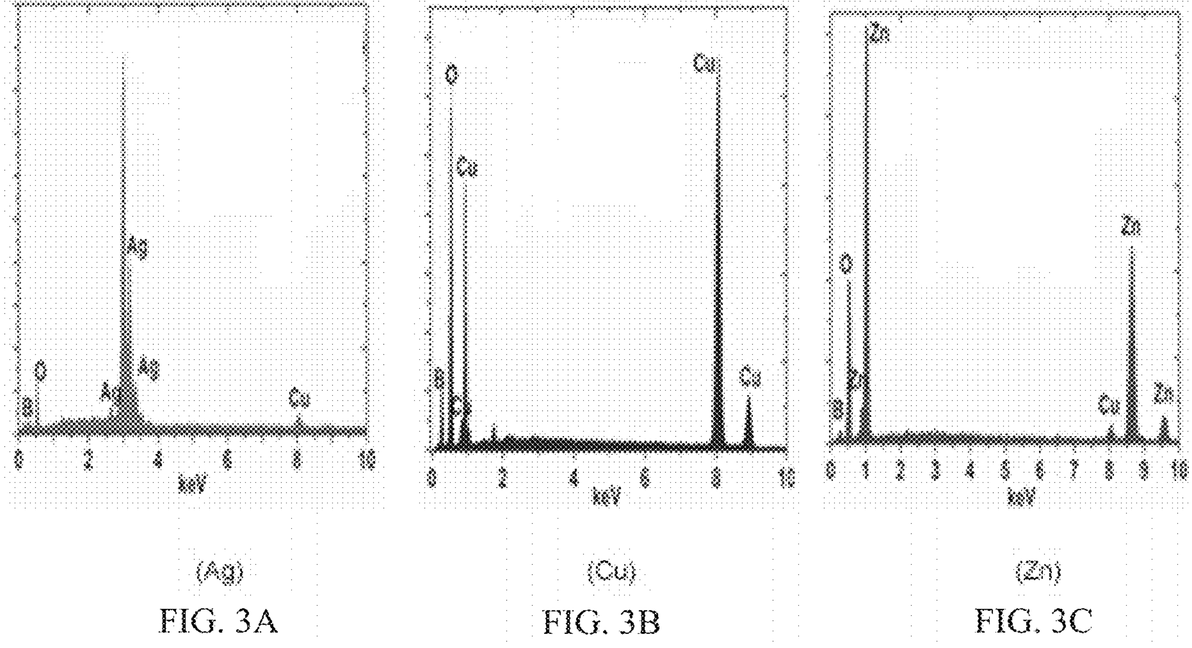
In FIGS. 3A-3C, EDX images of silver borate, copper borate and zinc borates obtained by means of the subject matter method are given.

In FIGS. 3A-3C, EDX images of silver borate, copper borate and zinc borates obtained by means of realization of the reaction between borax and perchlorate or nitrate solution, including a metal, in a stoichiometric proportion as shown in Equation 1 are given. The chemical components of the final products obtained by means of this are examined.

It is considered that the obtained metal borates can be used in various fields, they are recommended to be used for the surfaces desired to be antibacterial and health tools, and for ceramic, tile, glazed tile and vitrified products. Besides, said metal borates can be used in various materials which have fireproof characteristic.

What is claimed is:

1. A metal borate production method comprising a reaction between borax and a metal perchlorate; wherein the metal borate production method is realized in a stoichiometric proportion and a synthesis of nano-structured metal borates having antibacterial characteristic without addition of a second solvent or additive substance to a reaction medium, and comprises the following steps:

- adjusting reactive amounts of a metal perchlorate and a borax compound to be at a value between 1:1 and 2:1 by mole in a manner compliant to a reaction stoichiometry;
- adding the borax compound to the metal perchlorate with adjusted amounts and applying a mixing process at a value between 25 rpm and 250 rpm;
- conducting the reaction for at least 2 hours at a fixed temperature to obtain precipitation;
- applying washing, filtration and drying processes to the precipitation obtained as a result of the reaction to obtain a final product; and
- applying a sintering process the final product between temperatures 400° C. and 1500° C.

2. The metal borate production method according to claim 1, wherein the metal in the metal perchlorate comprises one or more of Zn, Cu having +2 ion valence, and Ag having +1 ion valence.

3. The metal borate production method according to claim 1, wherein the fixed temperature in the reaction is selected from a range between 40° C. and 90° C.

4. The metal borate production method according to claim 1, wherein a pH of the reaction medium is at a value between 6 and 8.

5. The metal borate production method according to claim 1, wherein the sintering process is realized at a fixed temperature for between 2 and 24 hours.

* * * * *